April 13, 1937.   R. C. BOUGHTON   2,076,876
PIPE JOINT AND MEANS FOR SEALING THE SAME
Filed March 29, 1933   2 Sheets-Sheet 1

INVENTOR.
ROGER C. BOUGHTON
BY
HIS ATTORNEY

April 13, 1937.  R. C. BOUGHTON  2,076,876
PIPE JOINT AND MEANS FOR SEALING THE SAME
Filed March 29, 1933   2 Sheets-Sheet 2
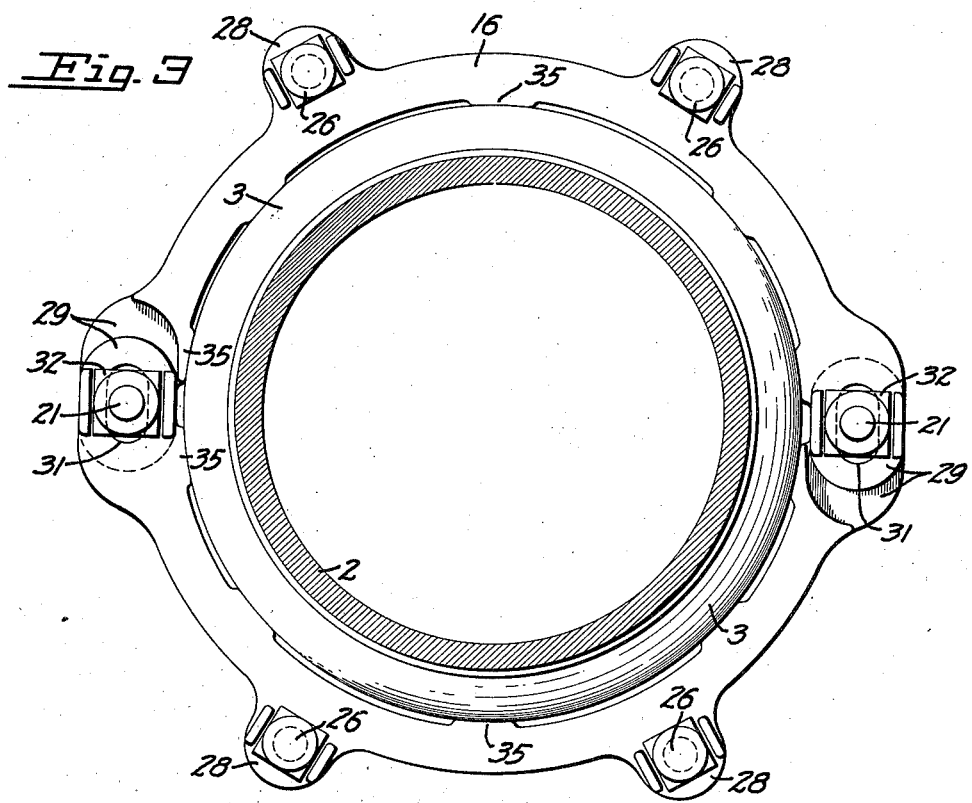
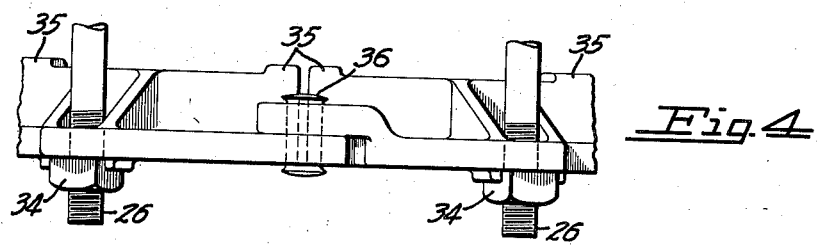
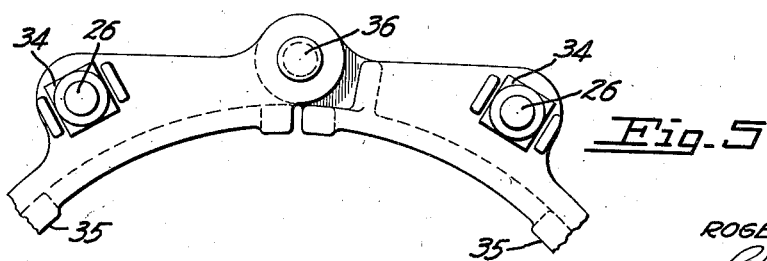
INVENTOR.
ROGER C. BOUGHTON
BY
HIS ATTORNEY Patented Apr. 13, 1937

2,076,876

UNITED STATES PATENT OFFICE 2,076,876

PIPE JOINT AND MEANS FOR SEALING THE SAME

Roger C. Boughton, San Gabriel, Calif.

Application March 29, 1933, Serial No. 663,333

8 Claims. (Cl. 285—119)

My invention relates to a pipe line having bell and spigot joints, and more particularly to the sealing of joints in such a line.

It is among the objects of my invention to provide improved means for reenforcing the packing in bell and spigot pipe joints, and more specifically to improve the gasket type of auxiliary packing for such joints.

One of the specific objects of my invention includes the provision, in an auxiliary packing of the character described, of means for preventing "cold flow" of the gasket.

Another object of my invention is to provide a clamp structure for the gasket which may be readily mounted on an installed pipe line, and which is especially adapted to accommodate irregularities in the pipe.

Still further objects of my invention include the provision of improved means for adjusting the clamp in its mounted position, and means for locking the same in a selected position of adjustment.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 3 is a transverse vertical sectional view taken in a plane indicated by the line 3—3 of Figure 1, showing the bell ring of the clamping structure in end elevation.

Figure 4 is a fragmentary plan view showing a variant form of clamp ring construction; and Figure 5 is an elevation of the same.

Due to the losses and dangers involved in leaky gas lines, it is highly desirable to have an auxiliary packing structure which may be applied to reenforce a defective packing in a joint. For the purpose of stopping leaks which develop in the ordinary bell and spigot joints, the gasket type of auxiliary packing has proven the most satisfactory and economical. However, there are several defects in the present design of this auxiliary packing structure.

For example, the gaskets in these structures are subject to what is known as "cold flow". That is, under continued pressure they tend to extrude from their seated positions against the end of the bell, and after a period lose their efficacy as a packing. Another shortcoming of devices of this type is that the clamp structures used to compress the gasket are difficult to install, caused largely by their inability to accommodate irregularities in the pipes. Still another defect resides in the fact that the clamp structures become loosened and thereby release the pressure on the gaskets.

It is the broad object of my invention to provide a pipe joint embodying improvements by which the above defects are avoided.

In terms of broad inclusion, the improvements embodying my invention relate to a bell and spigot pipe joint. For the purpose of sealing such a joint, I provide a gasket surrounding the spigot pipe adjacent the bell. Means are provided for confining the gasket to a limited space about the end of the bell to prevent extrusion thereof under pressure, and clamp means mounted on the pipe are provided for compressing the gasket. Means are preferably provided for adapting the clamp to readily fit on the pipe, and means are also preferably provided for locking the clamp in a selected position of adjustment.

Figure 1:
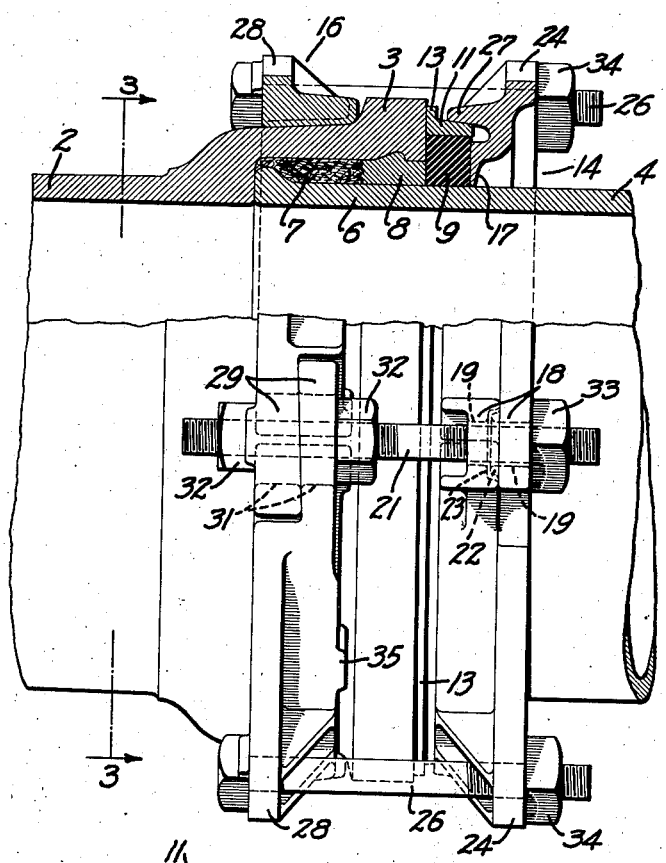
Figure 1 is a side view, partly in section and partly in elevation, showing a pipe joint embodying the improvements of my invention.

In greater detail, and referring particularly to Figure 1, the improvements embodying my invention relate to a pipe joint formed by a pipe 2 having a bell end 3 in which is seated the spigot end 6 of an adjacently laid pipe 4. The joint is preferably packed in the usual manner. Ordinarily such a packing comprises an inner portion 7 of a fibrous material, such as jute, and an outer portion 8 of a metallic material, such as lead.

As a means for sealing the joint, and for reenforcing the packing just described, I provide a gasket ring 9 about the spigot pipe 4 and adjacent the bell 3. This ring is preferably of rectangular cross section, and, as best shown in Figure 1, lies in the corner between the bell 3 and pipe 4. The gasket 9 may be of any suitable resilient material, such as a rubber composition.

Figure 2:
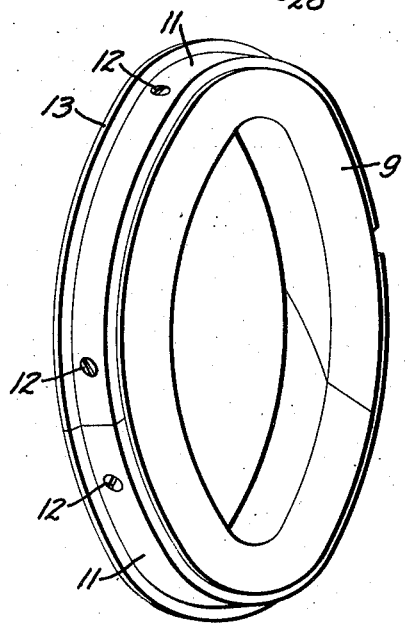
Figure 2 is a perspective view showing the gasket and the floating retaining ring.

Referring particularly to Figure 2, the packing ring 9 is split transversely along a bias to provide an overlapping joint. The splitting of the packing ring permits the latter to be positioned around the pipe, and the overlapping splice effects a tight joint when the ring is under pressure. The ring 9 is preferably formed with an inside diameter somewhat larger than the pipe diameter, so that the ring may be cut or trimmed to size when it is positioned about the pipe. This is to take care of variations in pipe diameter which exist in a given size of commercial pipe.

As shown in Figures 1 and 2, a floating retaining ring 11 is provided about the periphery of the gasket ring 9. This ring is split into halves to permit insertion thereof about the pipe, and the half portions are preferably secured to the gasket ring 9, as by suitable screws 12. The outer surface of the floating ring 11 preferably tapers inwardly toward its forward edge, and the rear edge of the ring is preferably provided with an outwardly extending flange 13. The purpose of the flange 13 is to provide a rib against which a screwdriver or other suitable tool may be caught to draw the floating ring 11 and connected gasket ring 9 up against the bell 3 when the structure is being assembled.

Means are provided for compressing the gasket ring 9, and means are also provided for preventing outward movement of the split floating ring 11. To these ends a clamp is provided, preferably comprising a pair of rings 14 and 16. For purposes of convenience the ring 14 surrounding the spigot pipe 4 will be called a spigot ring, while the ring 16 surrounding the bell pipe 2 will be called a bell ring.

Still referring to Figure 1, the spigot ring 14 is provided with a comparatively thin inwardly projecting flange portion 17 for engaging and supporting the ring on the pipe. The spigot ring is formed in half sections so that it may be inserted about an installed line, and the ends of the sections are provided with offset portions 18 adapted to overlap and having apertures 19 through which suitable studs 21 may pass.

One of the offset portions 18 on each section is preferably provided with a lip 22 engaging a complementary recess 23 formed in the opposing portion. This provides an interlocking engagement between the ring sections, and aids in holding the same against spreading. The spigot ring 14 is also provided with a plurality of outwardly extending ears 24 through which the bolts 26 may pass.

A feature of the spigot ring to be noted is the provision of the relatively thin flange 17 for engaging the pipe 4. In the event of variation in the pipe size or irregularities in the pipe surface, it becomes an easy matter for a workman to make the ring 14 fit the pipe, since the shape of the opening bounded by the flange 17 may be varied with the removal of but little metal.

The inner side of the flange 17 is preferably flat to provide an abutment for engaging the outer side of the gasket ring 9. By this arrangement, as is also best shown in Figure 1, it will be seen that a movement of the spigot ring 14 toward the left will operate to press the gasket against the packing 8 and bell 3.

Means are provided on the spigot ring 14 for holding the split floating ring 11 against outward movement. This is preferably accomplished by an annular flange 27 formed on the ring 14 and arranged to extend over the floating ring. The inner surface of this flange is preferably provided with a tapered surface complementary to that of the floating ring, and enough initial clearance is provided between the flange 27 and the ring 11 so that these two elements will not move into interlocking engagement until suitable pressure has been applied to the gasket ring.

Of course it will be understood that the cross section of the gasket ring increases in heighth as the sides thereof are compressed. This means that the floating ring moves outwardly as the spigot ring moves toward the left. This outward flow of the gasket ceases however as soon as the floating ring moves into engagement with the locking flange 27. The compressing of the gasket ring also causes the latter to press inwardly against the spigot pipe 4, so that when the gasket is under compression it is forced tightly against both the bell 3 and pipe 4.

It is thus seen that the function of the floating ring 11 is that of a retaining ring for limiting the radial flow of the gasket. It is likewise seen that one of the functions of the spigot ring 14 is also that of a retaining ring for limiting the lateral flow of the gasket. In the interlocked position of these two rings or elements, as shown in Figure 1, the gasket is confined to a limited space about the end of the bell, and there is no opportunity for the gasket to extrude from its compressed position.

The bell ring 16 provides the means for anchoring the spigot ring 14, and is provided with a plurality of ears 28 through which the bolts 26 may pass. The ring 16 is also formed in half sections so that it may be inserted about the pipe line. Since the bell ring 16 provides anchorage for the spigot ring 14, the former is arranged to abut the bell 3. Preferably the entire bell ring is mounted on the bell 3, as is shown in Figures 1 and 3.

The ends of the bell ring sections are provided with offset portions 29 adapted to overlap and having suitable slots 31 therein through which the studs 21 may pass. A pair of nuts 32 threaded on each of the studs 21 on opposite sides of the portions 29 serve to draw these portions together, and a third nut 33 disposed on the outside of the spigot ring 14 serves to function along with the nuts 34 on the bolts 26 to draw the latter ring against the gasket. The slots 31 in the ears 29 allow ready adjustment of the bell ring.

From Figure 1 it will be observed that the opposing surfaces of the overlapping portions 29 taper outwardly toward the ends of the sections. This provides a reverse wedge action, and when the bolts 32 are tightened the sections of the bell ring are securely locked against spreading. This locking action is very important in the clamp of an auxiliary packing of the character described, because it insures that the bell or anchoring ring 16 will not become loosened to release the pressure on the gasket.

As shown in both Figures 1 and 3, the inside diameter of the bell ring 16 is somewhat larger than the portion of the bell upon which the ring rides. Contact between the ring and the bell is made through a plurality of inwardly extending lugs 35 spaced about the ring and extending transversely thereof. These spaced points of contact make it easier to fit the ring to an irregular surface, as will be readily understood. The lugs 35 also project forwardly of the ring 16 for abutting the flange portions of the bell 3. These spaced points of abutment also aid in fitting the ring to irregularities in the pipe construction.

The procedure in mounting the auxiliary packing structure on a pipe line is preferably as follows:

The gasket ring 9 is first cut or trimmed to size, and with its connected floating ring 11 is positioned about the pipe 4 against the bell 3 and the packing 8. In order to hold the packing ring about the pipe a suitable fastener, such as a forked pin, is preferably employed to temporarily fasten the ends of the ring 9 together. Following this operation the spigot ring 14 is fitted to the pipe 4, and where needed the flange 17 is filed until the fit is perfected.

Then, laying the spigot ring aside for a moment, the bell ring 16 is positioned about the pipe 2. This is effected by retaining one of the studs 21 to provide a hinge and then closing the ring sections about the pipe, following which the other stud is inserted. After turning the ring 16 until a good seat is found, the sections thereof are clamped together by tightening the nuts 32 on the studs. Due to the reverse wedge action between the overlapping portions 29 the ring sections are positively locked against spreading, as will be readily understood.

The spigot ring 14 is then slipped over the ends of the studs 21 and brought up against the packing ring. With the end of a suitable tool, such as a screwdriver, bearing against the flange 13 of the floating ring 11 the latter together with the packing ring is forced back against the bell 3. This assembled relation is then maintained by turning up the nuts 33 on the studs 21. The bolts 26 are then inserted and their nuts 34 together with the nuts 33 on the studs 21 are partially tightened to apply pressure on the gasket. The fork or other fastening means is then removed, and the nut tightened up. Figure 1 shows the relation between the gasket and the interlocked retaining rings when the nuts are finally cinched up.

The limiting of the outward movement of the floating ring by its interlocking engagement with the spigot ring causes the packing ring to bear down tightly against the spigot pipe as well as against the bell. Furthermore, the positive confinement of the packing ring by the interlocked retaining rings eliminates the possibility of "cold flow", and the stresses set up in the packing ring are preserved for the useful purpose of maintaining a tight seal at the joint.

Figures 4 and 5 show a variant form of construction, particularly adapted to clamping ring constructions for large sized pipes, when the rings have to be made up in more than two sections. In such instances it is preferred to divide the two half sections into segments and fasten the latter together by suitable means, such as the pin 36.

I claim:

1. In a bell and spigot pipe joint, a gasket ring surrounding the spigot pipe and lying against the bell, a retaining ring abutting the bell and engaging the periphery of the gasket, said ring having an outwardly extending flange portion along the edge abutting the bell, a second retaining ring riding on the spigot pipe and engaging a side of the gasket, said second ring having a flange portion overlying the first ring, and clamp means for moving the second ring against the gasket.

2. In a bell and spigot pipe joint, a gasket ring surrounding the spigot pipe and lying against the bell, a split retaining ring having rigid unbending sections abutting the bell and engaging the periphery of the gasket, said ring having a tapered outer surface, a second retaining ring riding on the spigot pipe and engaging a side of the gasket, said second ring having a flange portion overlying the first ring and with a tapered inner surface complementary to that of the first retaining ring, the edge of the first ring being spaced from the second so that the latter is free to move inwardly toward the first ring, and clamp means for moving the second ring against the gasket.

3. In a bell and spigot pipe joint, a gasket surrounding the spigot pipe adjacent the bell, a ring comprising a plurality of sections adapted to be positioned about the bell pipe and adapted to abut its bell portions, each section having an end portion overlapping an end of an adjacent section, said overlapping portions having their opposing surfaces tapering outwardly toward the ends of the sections and having slots therethrough, and a bolt passing through said slots for clamping the overlapping portions together.

4. In a bell and spigot pipe joint, a gasket ring surrounding the spigot pipe adjacent the bell, a split retaining ring surrounding the periphery of the gasket, the sections of said ring being rigid and unbending and having ends spaced to permit movement together when the ring is moved against the gasket, a second retaining ring separate from said first retaining ring for engaging a side of the gasket, and means for simultaneously moving the rings against the gasket to compress the latter.

5. In a bell and spigot pipe joint, a gasket ring surrounding the spigot pipe adjacent the bell, a plurality of separate retaining rings each engaging the gasket, and means for simultaneously moving the rings against the gasket to compress the latter, each of the rings being rigid and unbending to transmit compression forces over the entire portions of the gasket engaged by the rings.

6. In a bell and spigot pipe joint, a gasket ring surrounding the spigot pipe adjacent the bell, a plurality of interengaging retaining rings each engaging the gasket, and means for simultaneously moving the rings against the gasket to compress the latter, each of the rings being rigid and unbending to transmit compression forces over the entire portions of the gasket engaged by the rings.

7. In a pipe joint, a clamping ring comprising a plurality of sections adapted to surround the pipe, each section having an end portion overlapping an end of an adjacent section, said overlapping portions having their opposing surfaces tapering outwardly toward the ends of the sections, and means for clamping the overlapping portions of the sections together.

8. In a pipe joint, a gasket, a retaining ring engaging a face of the gasket, a second retaining ring separate from the first ring and engaging another face of the gasket and having a flange portion overlying the first ring, said second ring having an annular groove into which the first ring may extend, and clamp means for pressing the second ring against the gasket.

ROGER C. BOUGHTON.